United States Patent [19]

Jamzadeh

[11] Patent Number: 5,343,782
[45] Date of Patent: Sep. 6, 1994

[54] ANTI-FLARE METHOD USING OFFGOING SLIP SPEED AND RATE OF CHANGE OF SLIP-SPEED TO DETERMINE PRESSURE COMPENSATION FOR INCOMING CLUTCH

[75] Inventor: Fereydoon Jamzadeh, Indianapolis, Ind.

[73] Assignee: General Motors Corporation, Detroit, Mich.

[21] Appl. No.: 936,994

[22] Filed: Aug. 31, 1992

[51] Int. Cl.$^5$ ............................................. B60K 41/02
[52] U.S. Cl. .................................. 477/156; 364/424.1
[58] Field of Search ................. 364/424.1; 74/866, 867

[56] References Cited

U.S. PATENT DOCUMENTS

| | | | |
|---|---|---|---|
| 4,653,351 | 3/1987 | Downs et al. | 74/866 |
| 4,796,490 | 1/1989 | Butts et al. | 74/866 |
| 4,969,098 | 11/1990 | Leising et al. | 364/424.1 |
| 5,072,390 | 12/1991 | Lentz et al. | 74/866 X |
| 5,123,302 | 6/1992 | Brown et al. | 74/866 |

*Primary Examiner*—Leslie A. Braun
*Assistant Examiner*—Khoi Ta
*Attorney, Agent, or Firm*—Mark A. Navarre

[57] ABSTRACT

In a computer-based control, pressure is progressively decreased in an off-going clutch for gradual release while pressure is progressively increased in an on-coming clutch. Positive off-going clutch slip and the rate of slip change are monitored to detect the onset of turbine flare. A control calculates a compensation pressure which is added to the on-coming clutch pressure to reduce the slip and thus the flare. The control calculates a term proportional to slip and an integral term when the slip and slip rate are positive. When the slip rate goes negative, the control calculates a negative integral term. All the calculated terms are combined to produce the compensation pressure value.

12 Claims, 5 Drawing Sheets

ANTI-FLARE METHOD USING OFFGOING SLIP SPEED AND RATE OF CHANGE OF SLIP-SPEED TO DETERMINE PRESSURE COMPENSATION FOR INCOMING CLUTCH

The invention herein described was made in the course of work under a contract or subcontract thereunder with the Department of the Army.

FIELD OF THE INVENTION

This invention relates to a method of transmission control, and more particularly, to a method of controlling transmission upshifts to minimize turbine flare.

BACKGROUND OF THE INVENTION

Generally, a motor vehicle automatic transmission includes a number of gear elements coupling its input and output shafts, and a related number of torque establishing devices such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches. The input shaft is connected to the vehicle engine through a fluid coupling, such as a torque converter, and the output shaft is connected directly to the vehicle wheels.

In the type of transmission involved in this invention, the clutches are fluid operated, and each develops torque capacity in relation to the fluid pressure in its apply chamber once such apply chamber has been filled. Shifting from one forward speed ratio to another involves releasing the pressure supplied to an off-going clutch associated with the current speed ratio while initiating the supply of fluid pressure to an on-coming clutch associated with the desired speed ratio. Shifts performed in this manner are termed clutch-to-clutch shifts and require precise timing in order to achieve high quality shifting.

The present invention is directed to upshifting the transmission from a current speed ratio to a desired speed ratio which is numerically lower than the current ratio, the speed ratio being defined as the transmission input speed divided by the transmission output speed. Thus, an upshift involves a pulldown or reduction of the input speed.

The quality of an upshift depends on the cooperative operation of several functions, such as pressure changes and the timing of control events. One of the measures of upshift quality is turbine flare. Turbine flare during an upshift occurs when one or both of the following conditions are satisfied:

a) The on-coming clutch is underfilled when the off-going clutch is released. In this case, the turbine flare starts when the off-going clutch starts to slip, and the amount of such slip is indicative of the degree of flare.

b) The initial on-coming clutch pressure after the fill period is too low. In this case, the on-coming clutch does not have the required torque capacity to hold the turbine speed or pull it down, and the turbine flare starts during the transition from off-going clutch to on-coming clutch.

Typically, an upshift control, whether open loop or closed loop, is designed to manage the smooth transfer of torque from one clutch to the other within a given time period. If the time period expires, full pressure is applied to the on-coming clutch. If the on-coming clutch does not already have a reasonably high pressure, the sudden application of high pressure can have the effect of a shock as a result of a undesirably rapid change of axle torque. Uncontrolled turbine flare leads to such a condition.

SUMMARY OF THE INVENTION

This invention is directed to an improved upshift control which identifies and minimizes turbine flare during upshift by controlling on-coming clutch pressure. The slip speed across the off-going clutch is the primary variable used to determine the flare and correct the on-coming clutch pressure.

In the course of an upshift, the pressure on both the on-coming clutch and the off-going clutch are varied under computer control which develops pressure command signals for both clutches. In particular, the off-going clutch pressure is progressively decreased to effect clutch release, while the on-coming clutch is applied. The on-coming pressure includes a fill pressure for filling the respective apply chamber and a subsequent apply pressure which progressively increases to engage the on-coming clutch.

A control responsive to slip is used to calculate a compensation term which adjusts the oncoming pressure command signal to attenuate flare, should it occur. The turbine speed and the output speed of the transmission are monitored throughout the shift and the value of the off-going clutch slip is periodically calculated. The change of slip between consecutive slip calculations is used as a measure of rate of change of slip speed, or slip rate.

When the slip is positive and the slip rate is also positive but relatively small, a term proportional to slip is produced and an integral term is also produced by accumulating slip rate values in consecutive program loops. The proportional and the integral terms are added to produce the compensation term. When the flare reduces in speed in response to the compensation term, the slip rate becomes negative. At this point, a negative integral term is combined with the other terms in the compensation term to thereby reduce the compensation signal and avoid an over-correction. As a result of the compensation, the flare is attenuated and the on-coming clutch capacity increases gradually at a rate sufficient to assume the full input torque before a time-out period expires.

DESCRIPTION OF THE INVENTION

Figure 1:
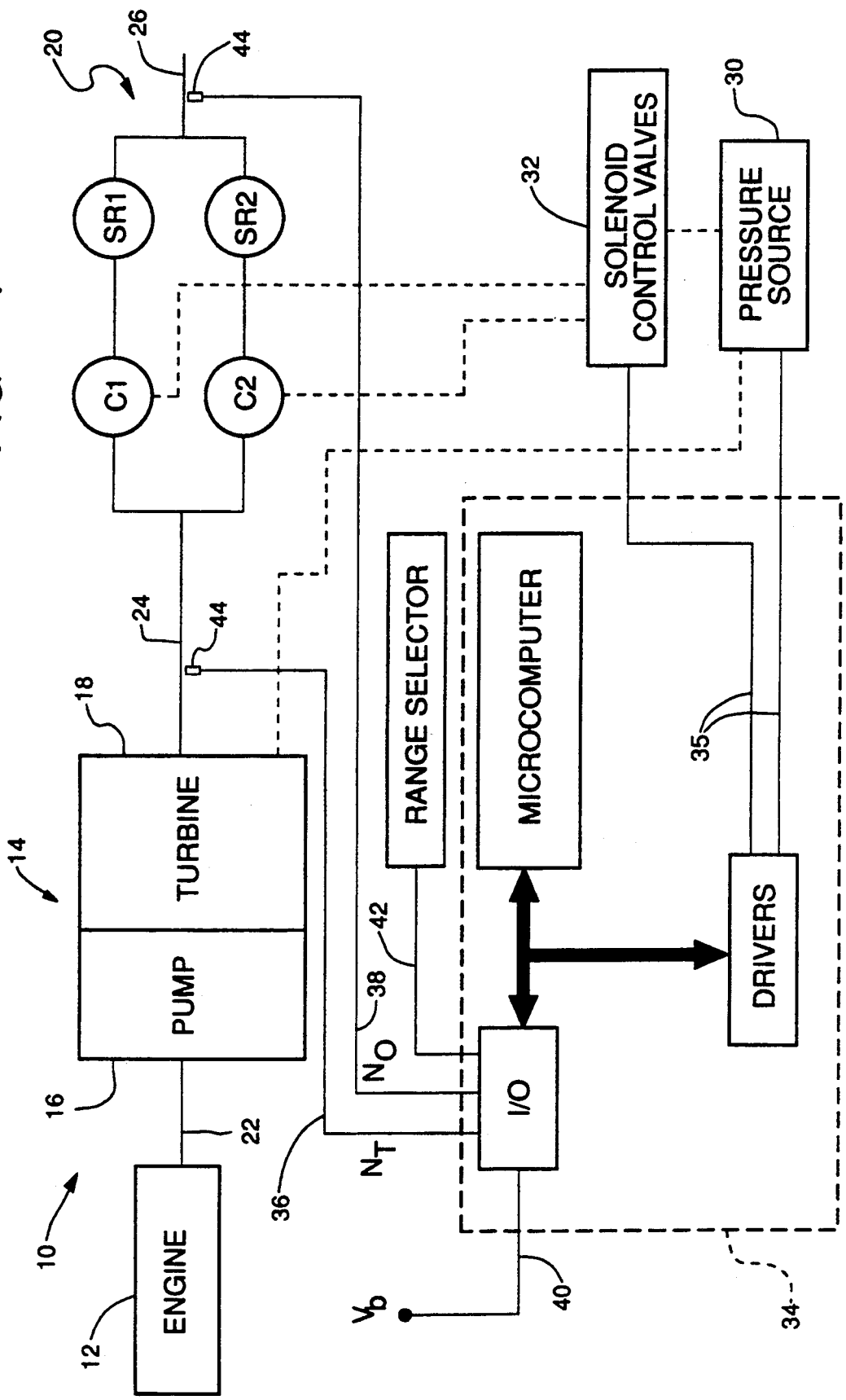
FIG. 1 is a schematic illustration of a transmission, including a computer-based control unit for carrying out the control of this invention.

Referring now to the drawings, and more particularly to FIG. 1, the reference numeral 10 generally designates a motor vehicle drive train, including a throttled internal combustion engine 12, a fluidic torque converter 14 comprising a pump 16 and a turbine 18, a multiple speed fluid operated power transmission 20 schematically represented by two speed ranges SR1 and SR2 controlled by clutches C1 and C2, respectively. Gear shifts are accomplished by selectively engaging and disengaging the clutches C1 and C2.

The transmission depicted here is representative of well known transmissions having several forward ranges, say six ranges, for example, and therefore having a larger number of clutches and speed ratios. The two ratio model, however, is used to illustrate the principal of the anti-flare upshift control. It is assumed then, that initially, the clutch C1 is fully applied and the speed ratio SR1 is functioning. The ratio SR2 is a lower ratio than SR1 and an upshift is effected by releasing clutch C1 and applying clutch C2.

The engine 12 is connected to the torque converter 14 via shaft 22, the torque converter 14 is connected to the transmission 20 via shaft 24, and the transmission 20 has an output shaft 26 coupled to a pair of drive wheels through a final drive gearset (not shown). The speed and torque relationships between the engine 12 and the drive wheels of the vehicle are controlled by the fluid operated clutches C1 and C2.

The clutches C1 and C2, as well as the torque converter 14, are supplied by a pressure regulated hydraulic pressure source 30. The clutches are coupled to the source 30 via solenoid control valves 32 which determine the admission or discharge of fluid to the clutches and the clutch pressure. The operation of pressure source 30 and the solenoid operated control valves 32 is controlled by a computer-based control unit 34 via lines 35 in response to various input signals representative of system parameters. Such inputs include, among others, a torque converter output shaft speed signal Nt on line 36, a transmission output shaft speed signal No on line 38, a system supply voltage signal Vb on line 40 and an operator range selector position signal on line 42. The input signals No and Nt are obtained with conventional electrical transducers such as magnetic speed pickups 44.

Internally, the control unit 34 comprises a number of conventional devices including a microcomputer with internal clock and memory, an input/output device (I/O) and an array of drivers. A driver is dedicated to each solenoid control valve 32. The driver outputs are used to energize the respective solenoid control valves. The driver currents determine the hydraulic pressure supplied by the solenoid control valves, with a low current yielding a low pressure and a high current yielding a high pressure for a normally closed valve. Accordingly, the computer control, when properly programmed, is effective to manage the clutch pressures to effect an upshift from SR1 to SR2 by controllably releasing the pressure in the off-going clutch C1 and applying pressure to the on-coming clutch C2.

FIGS. 2 through 5 are flow diagrams representative of computer program instructions, executed by the computer-based control unit 34 of FIG. 1 in carrying out the shift control technique of this invention. In the description of the flow diagrams the functional explanation marked with numerals in angle brackets, <nn>, refers to blocks bearing that number.

Figures 2, 4:
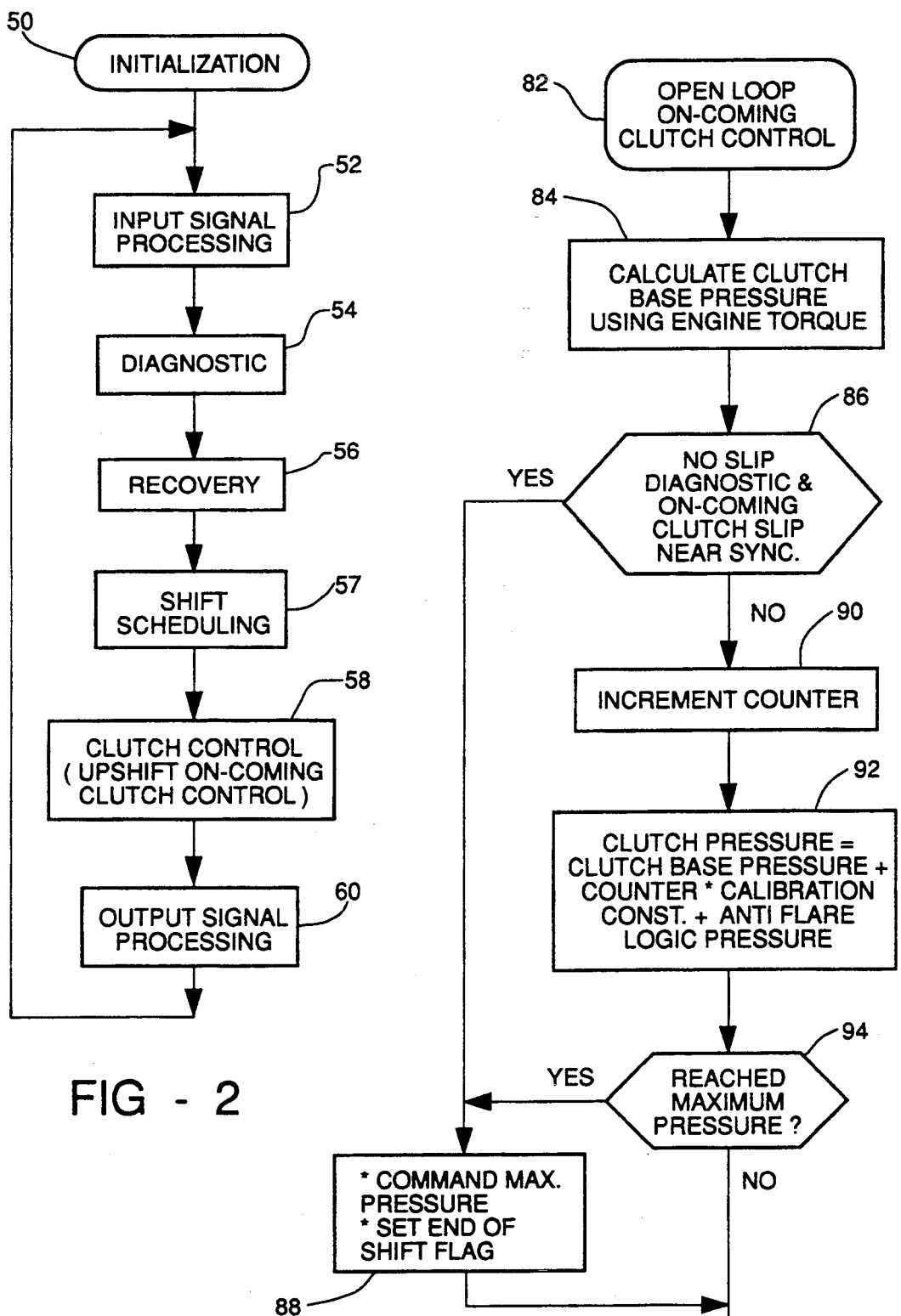
FIGS. 2, 3, 4 and 5 are flow diagrams representative of computer program instructions executed by the computer-based controller of FIG. 1 in carrying out the shift control of the transmission.

FIG. 2 represents an executive or main loop program which directs the sequential execution of various subroutines. Initialization <50> designates a series of instructions executed at the initiation of each period of vehicle operation for setting the various timers, registers and variable values of control unit 34 to predetermined initial values. Thereafter, the blocks 52 to 60 are sequentially and repeatedly executed as indicated by the flow diagram lines at a rate which, typically, may be 20 msec per loop.

After initialization, the various input signal values are read and conditioned for use by the microcomputer <52>. The input signals are tested for integrity and the system operation is monitored to diagnose any operational problems <54>. For this purpose it is sometimes desirable to utilize more transducers, e.g., clutch pressure sensors, to check the operation of various system elements. Then any problems are analyzed and solutions to overcome or otherwise deal with them are developed <56>.

After shift scheduling determines that a certain shift should occur <57>, the clutch control block 58 analyzes the various system input signals, develops pressure command signals for operation of each clutch and includes a routine for upshift on-coming clutch control. Then the command signals are conditioned to effect the solenoid drive currents to carry out the pressure commands for specific shift operations <60>, and the required control signals are outputted to the drivers for the solenoid operated control valves 32.

Figure 3:
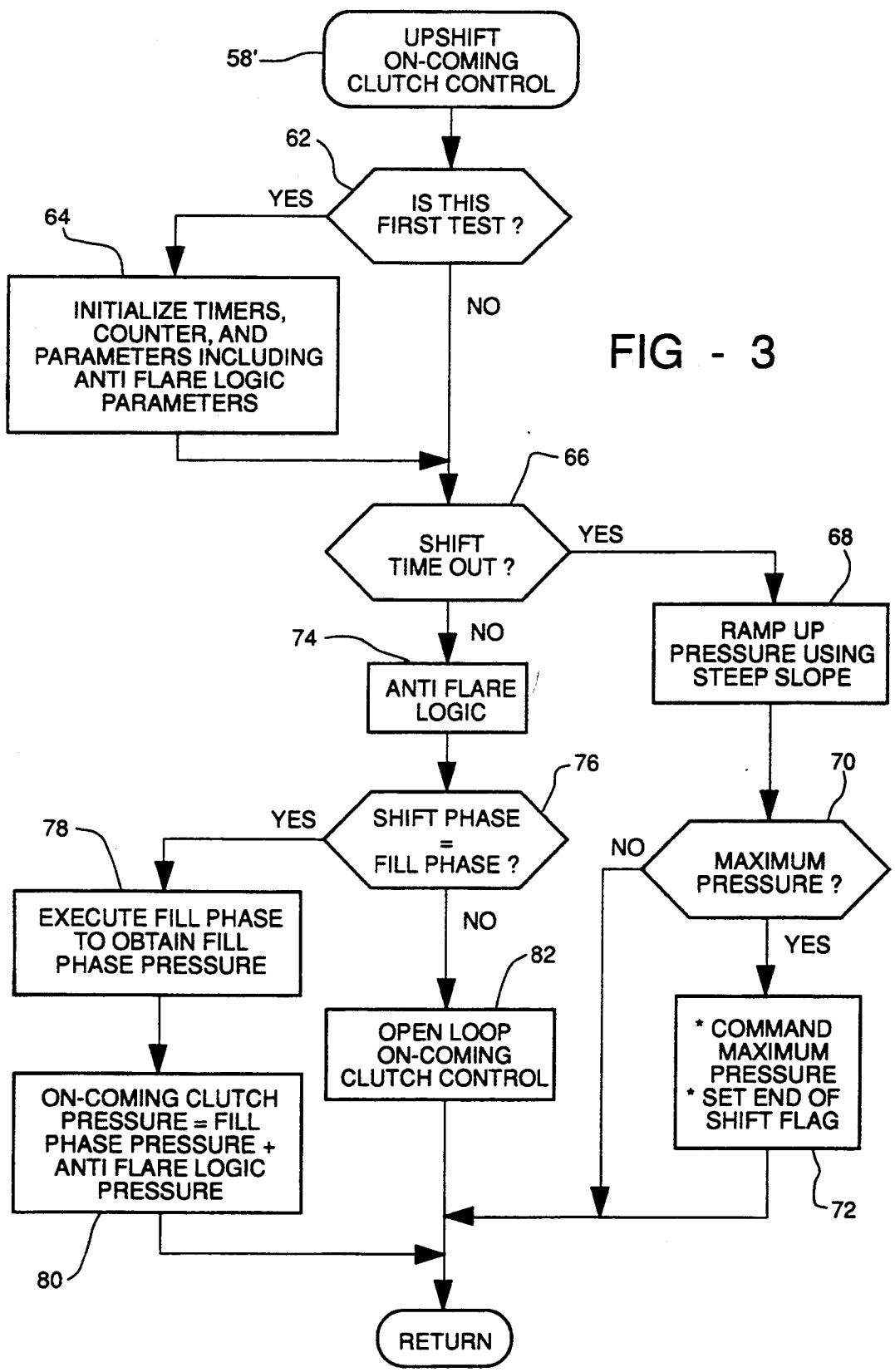

In FIG. 3, the routine for upshift on-coming clutch control 58' is shown. The general approach for on-coming clutch control is to first quickly fill the clutch by commanding a high pressure for a brief fill time, and then, starting at a lower pressure, by increasing the pressure at some ramp rate. If the shift has just been initiated <62>, timers counters and parameters are initialized including anti-flare logic parameters <64>. Typically, only a limited time, say 1.5 sec is permitted for shift completion; if the time expires <66>, a rapid clutch pressure increase is commanded <68>. Once the maximum commanded pressure has been attained <70>, the maximum pressure is commanded and an end-of-shift flag is set <72> and the routine is completed.

If the shift has not timed out <66>, the anti-flare logic is applied <74> to develop, when appropriate, additional pressure command values to increase the on-coming clutch pressure before time-out. If the shift is still in the fill phase <76>, the fill phase commands are executed to obtain the fill phase pressure <78> and the on-coming clutch pressure is commanded to be the fill phase pressure plus compensation pressure mandated by the anti-flare logic <80>. When the shift phase is no longer in the fill phase <76>, the open loop on-coming clutch control routine is executed <82>.

The open loop on-coming clutch control routine 82 is shown in FIG. 4. Clutch base pressure is calculated as a function of engine torque <84>, the torque being supplied from an engine controller, not shown, or being determined from a table of torque as a function of engine speed and throttle position. If the diagnostic routine 54 does not indicate a slip problem and the on-coming clutch slip is near synchronization <86>, the maximum pressure is commanded and the end-of-shift flag is set <88>; otherwise a counter is incremented <90> and the command clutch pressure is calculated as the base pressure, plus the product of the counter value and a constant, plus the anti-flare logic pressure <92>. If the maximum pressure has been reached <94>, the program goes to block 88; otherwise the routine exits.

The anti-flare logic routine 74 generates a compensation pressure value P which, when added to the fill pressure or the open loop pressure for the on-coming clutch, should be sufficient to stem the on-coming clutch slip which allows flare. The value P includes a term $P_p$ proportional to slip S and, depending on the rate of slip, a positive integral term $P_{ui}$ and a negative integral term $P_{di}$. The pressure component terms are set to zero at the shift initiation by the block 64 and new values for the terms are calculated during the shift as a function of the slip S. The slip S will have been calculated in the diagnostic block 54 as $S = Nt - No*SR1$ which is the difference between the turbine speed and the product of the output speed and the current speed ratio.

Figure 5:
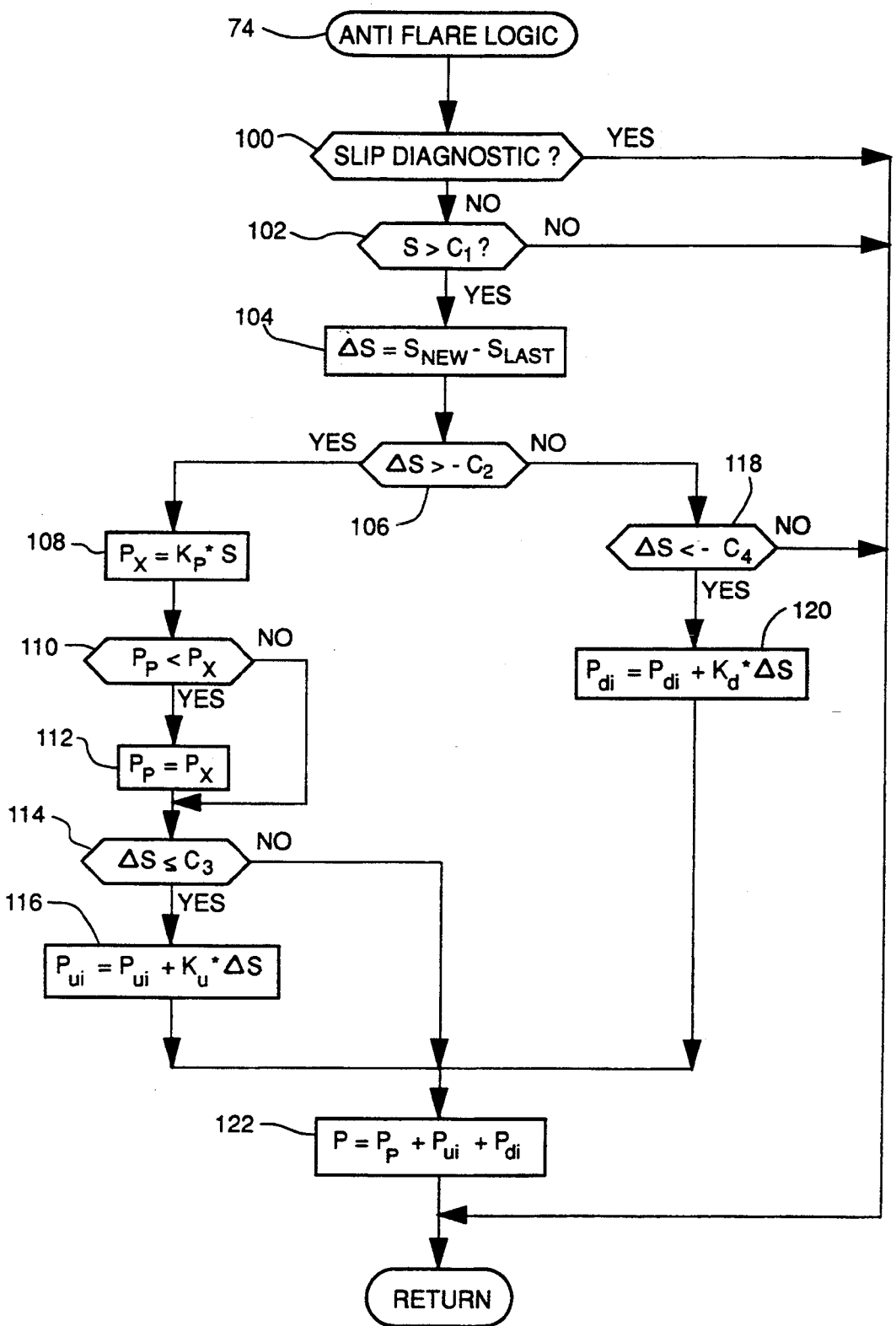

FIG. 5 shows the anti-flare logic routine 74. If the diagnostic routine 54 indicates a problem with the slip value, the anti-flare logic is not used <100>. Also, if the slip S is not above a threshold speed C1, say 25 rpm, the pressure compensation calculation is bypassed <102>. When slip is above the threshold C1, the rate of slip DELTAS is calculated as the change in slip since the previous program loop or $DELTAS = S_{new} - S_{last}$ <104>. If DELTAS is above a threshold C2 <106>, a trial proportional term is first calculated as $P_x = K_p*S$ where $K_p$ is a calibrated gain factor such as 0.2 <108>.

To select the maximum value of the trial proportional term, as it is calculated in successive loops, it is determined whether $P_p$ is less than $P_x$ <110>, and if so $P_p$ is set equal to $P_x$ <112>. In most cases of positive DELTAS, the term $P_p$ is sufficient for pressure compensation, but where the turbine speed is near the engine governed speed and DELTAS is small, the proportional term alone does not provide sufficient correction and a more robust compensation is desirable. Accordingly, if DELTAS is less than a threshold C3, say 5 rpm <114>, an integral term $P_{ui}$ is calculated as $P_{ui} = P_{ui} + K_u*DELTAS$ where $K_u$ is a gain constant such as 0.1 <116>. This term is particularly effective when the turbine flare begins near the governed speed. When the on-coming pressure becomes sufficient to start reducing flare, DELTAS is no longer positive <106> and new values of $P_p$ and $P_{ui}$ are not generated but the last calculated value is retained.

If the turbine flare occurs due to an underfill condition, the proportional term and integral term for positive slip difference effectively reduces the fill time by increasing the commanding pressure. However, when the clutch is filled, the resulting pressure might be more than the desired pressure for turbine pull down, resulting in a shift shock. To offset a pressure which becomes too high, the routine assesses whether DELTAS becomes more negative than a threshold C4, such as 25 rpm <118>. If so, a negative integral term $P_{di}$ is calculated as $P_{di} = P_{di} + K_d*DELTAS$ <120>. Pdi is effective to suitably reduce the compensation pressure value P. The final step in the anti-flare logic is to sum the proportional and integral terms to calculate the pressure value P <122>. The value P is added to the commanded on-coming clutch pressure in all phases of the shift, as indicated at <80> and <92>.

Figure 6:
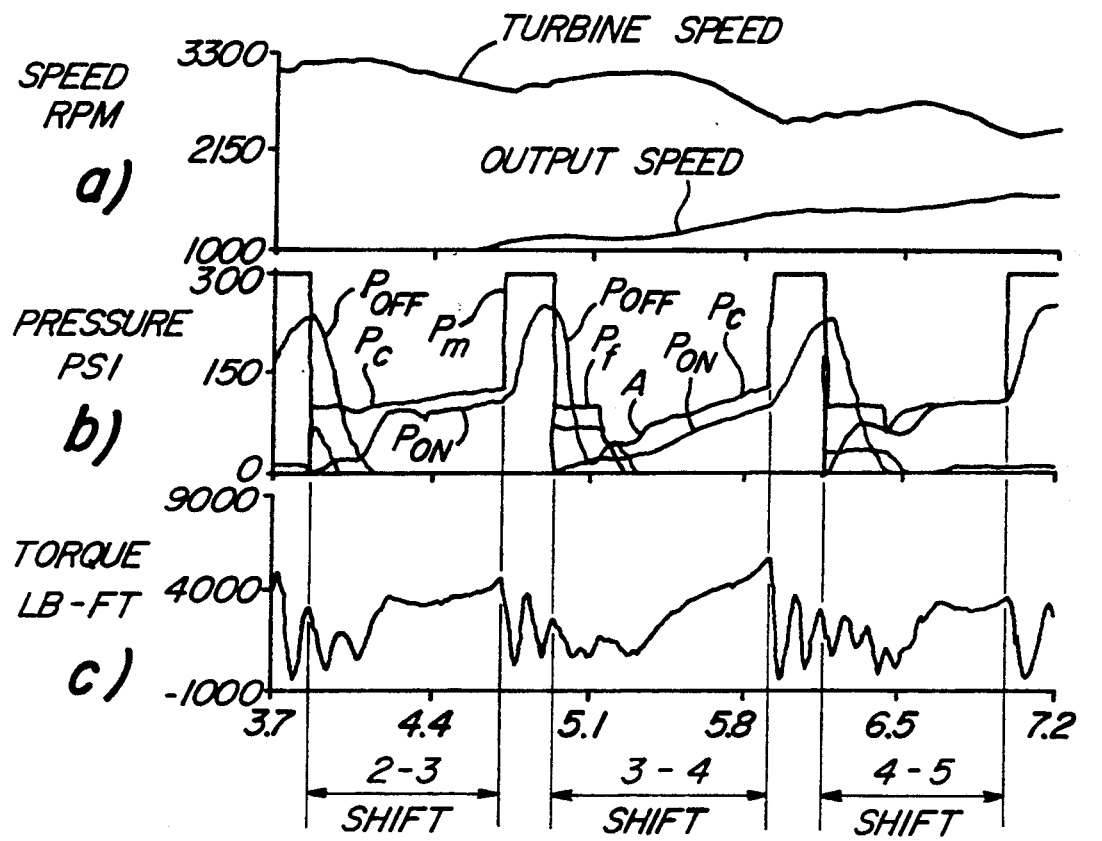
FIG. 6, parts (a) through (f), is a graphical illustration of transmission parameters experienced during a number of consecutive upshifts including turbine and output speeds, the commanded and actual clutch pressures, output torque, off-going clutch slip and flare compensation.
Figure 6:
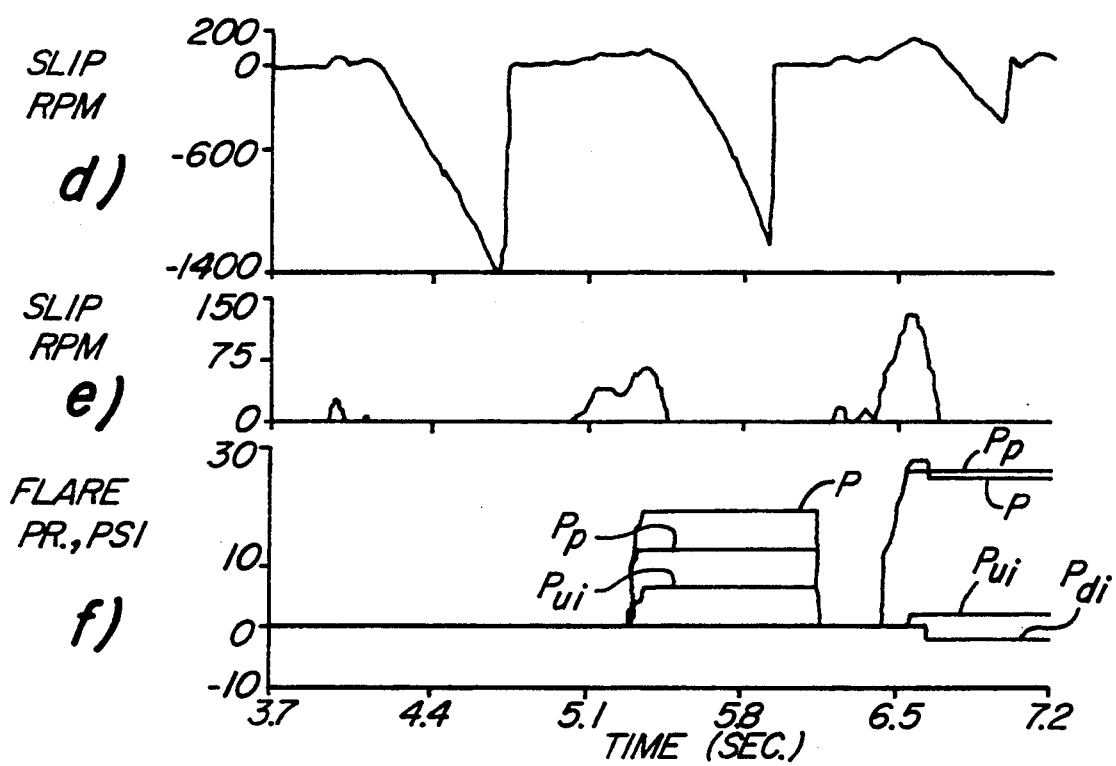

FIG. 6, graphs a-f, illustrate transmission shift parameters generated during an anti-flare logic simulation for a six speed ratio transmission. The graphs cover a 2-3 shift, a 3-4 shift and a 4-5 shift performed in rapid sequence, covering the time period of 3.7 seconds to 7.2 seconds of the test.

Graph (a) shows the turbine speed Nt and the transmission output speed No over the sequence of shifts. Graph (b) shows the commanded on-coming clutch pressure $P_c$, the actual on-coming pressure $P_{on}$, and the off-going clutch pressure $P_{off}$ during each shift. The line identified as $P_{on}$ in one shift becomes $P_{off}$ in the next shift. The transmission output torque is displayed in graph (c). Torque oscillations occurring between shifts are a consequence of mismatch between turbine and output accelerations. The off-going clutch slip S is shown in two graphs, (d) and (e). In graph (d), the slip is shown over its whole range, both positive and negative, and in graph e only the positive values of slip are shown and are scaled for better visibility. The graph (f) shows the compensation pressure P and its components as calculated by the anti-flare logic.

During the 2-3 shift, the slip S, as shown in graph (e), does not reach the threshold C1 (25 rpm) so that no compensation pressure P is calculated. It is apparent from graph (b) that the off-going pressure $P_{off}$ is ramped down to gradually release the off-going clutch, and the commanded pressure $P_c$ as developed by the on-coming clutch control logic 58' causes the actual on-coming clutch pressure $P_{on}$ to increase at a steady rate. When the maximum pressure $P_m$ is commanded the on-coming pressure $P_{on}$ ramps up at a higher rate. In this illustration, the next shift begins before the full clutch pressure is attained.

During the 3-4 shift, the commanded fill pressure $P_f$ is clearly shown. This shift does cause the slip to exceed the threshold C1. At that time, the proportional term $P_p$ is immediately generated, as shown in graph (f) and the integral term $P_{ui}$ is built up in steps. When the slip S starts to decrease the anti-flare terms remain constant. The rate of slip decrease is not sufficient to trigger the calculation of a negative integral term. The effect of the calculated pressure P is reflected in the commanded pressure $P_c$ at point A and in the actual pressure $P_{on}$ which then increases in slope, thereby heading off a significant pressure deficiency when the maximum pressure is commanded. The calculated value P and its components are reset to zero at the beginning of the 4-5 shift.

During the 4-5 shift the anti-flare logic is again invoked due to the large slip S. The value $P_p$ is increased in several stages and is the dominant term in the pressure value P because of the large slip value. The integral term is not immediately calculated because, at first, DELTAS is greater than the threshold C3; when the integral value $P_{ui}$ is calculated it does not become large. When the slip declines at a sufficient rate, the negative integral term $P_{di}$ is calculated. In this instance, it too is small and has only little effect on the total compensation pressure P. In other circumstances, however, the negative integral term can become very important in correctly adjusting the on-coming clutch pressure.

It will thus be seen that the anti-flare logic is able to compensate for low on-coming clutch pressure which results in slip of the on-coming clutch and turbine flare to assure a shift free of excessive shock upon timing out of the shift.

The embodiments of the invention in which an exclusive property or privilege is claimed are defined as follows:

1. In a control for an automatic transmission having a turbine driving an output shaft through a gearset which achieves an upshift by controllably releasing an off-going torque transmitting device for a current speed ratio and controllably applying a fluid operated on-coming torque transmitting device for a lower speed ratio by a commanded on-coming pressure, wherein the turbine is subject to flare if the on-coming pressure is insufficient when the off-going torque transmitting device is released, a method of controlling the turbine flare comprising the steps of:

determining a slip speed across the off-going torque transmitting device, wherein the slip speed is a measure of flare;

calculating a rate of slip speed change;

when the determined slip speed is positive and the calculated rate of slip speed change is positive, calculating a proportional term based on the detected slip and a first integral term based on the calculated rate of slip speed change;

summing the proportional and integral terms to form a compensation term; and correcting the commanded on-coming pressure in accordance with the compensation term.

2. The method of controlling flare as defined in claim 1 including the step of calculating the first integral term only when the calculated rate of slip speed change is below a positive threshold.

3. The method of controlling flare as defined in claim 1 including the steps of:

calculating a second integral term based on the calculated rate of slip speed change when the detected slip is positive and the calculated rate of slip speed change is less than a determined negative value; and including the second integral term in the compensation term.

4. The method of controlling flare as defined in claim 1 wherein the slip speed is determined periodically during a shift and wherein the step of calculating a rate of slip speed change comprises subtracting a previously determined slip speed from a currently determined slip speed.

5. The method of controlling flare as defined in claim 1 wherein an interim proportional term is calculated periodically during the shift and wherein the step of calculating the proportional term includes updating the proportional term in accordance with the interim term whenever the interim term exceeds the proportional term.

6. In a control for an automatic transmission having a turbine driving an output shaft through a gearset which achieves an upshift by controllably releasing an off-going torque transmitting device for a current speed ratio and controllably applying a fluid operated on-coming torque transmitting device for a lower speed ratio by a commanded on-coming pressure, wherein the turbine is subject to flare if the on-coming pressure is insufficient when the off-going torque transmitting device is released, a method of controlling the turbine flare comprising the steps of:

measuring turbine speed and output speed;

determining a slip speed across the off-going torque transmitting device as the measured turbine speed less the product of the measured output speed and the current speed ratio, wherein the slip speed is a measure of flare;

calculating a rate of slip speed change;

when the determined slip speed is positive and the calculated rate of slip speed change is positive, calculating a proportional term based on the detected slip and a positive integral term based on the calculated rate of slip speed change;

when the determined slip speed is above the first threshold and the calculated rate of slip speed change is less than a determined negative value, calculating a negative integral term based on the calculated rate of slip speed change;

summing the proportional and the integral terms to form a compensation term; and correcting the commanded on-coming pressure in accordance with the compensation term.

7. The method of controlling flare as defined in claim 6 wherein the proportional and the positive integral terms are updated periodically when the calculated rate of slip speed change exceeds the second threshold; and the negative integral term is updated periodically when the calculated rate of slip speed change is below the determined negative value.

8. The method of controlling flare as defined in claim 6 wherein the proportional term is calculated as the product of the determined slip and a gain factor.

9. The method of controlling flare as defined in claim 6 wherein a trial term is calculated periodically as the product of the determined slip and a gain factor and the proportional term is selected as the largest periodically calculated trial term.

10. The method of controlling flare as defined in claim 7 wherein each integral term is calculated by calculating the product of the calculated rate of slip speed change and a gain factor and summing such products for a series of update periods.

11. In a control for an automatic transmission having a turbine driving an output shaft through a gearset which achieves an upshift by controllably releasing an off-going torque transmitting device for one gear range and controllably applying an on-coming torque transmitting device for a higher gear range by a commanded on-coming pressure, wherein the turbine is subject to flare if the on-coming pressure is insufficient when the off-going torque transmitting device capacity is reduced, a method of automatically shifting the transmission comprising the steps of:

disengaging the off-going torque transmitting device by reducing its pressure according to an off-going pressure command having a progressively decreasing value to complete such disengagement;

engaging the on-coming torque transmitting device by successively supplying it with hydraulic pressure for a predefined fill period and thereafter controlling such pressure to effect a progressive engagement of the same;

determining slip speed across the off-going torque transmitting device and the rate of slip speed change;

when the slip is positive and the rate of slip speed change is positive, calculating a term proportional to slip and an integral term for positive slip rate;

calculating a compensation term by summing the proportional and the integral terms; and correcting the commanded on-coming pressure by the amount of the compensation term.

12. The method of shifting a transmission as defined in claim 11 including the steps of:

calculating an integral term for negative slip rate when the slip is positive and the rate of slip speed change is less than a determined negative value; and including the integral term for negative slip rate in the compensation term.

* * * * *